(12) United States Patent
Lee et al.

(10) Patent No.: US 10,476,656 B2
(45) Date of Patent: Nov. 12, 2019

(54) SYSTEM AND METHOD FOR ASYNCHRONOUS, MULTIPLE CLOCK DOMAIN DATA STREAMS COALESCING AND RESYNCHRONIZATION

(71) Applicant: DeGirum Corporation, Menlo Park, CA (US)

(72) Inventors: Winston Lee, Palo Alto, CA (US); Kit S. Tam, Menlo Park, CA (US)

(73) Assignee: DeGirum Corporation, Campbell, CA (US)

( * ) Notice: Subject to any disclaimer, the term of this patent is extended or adjusted under 35 U.S.C. 154(b) by 71 days.

(21) Appl. No.: 15/953,237

(22) Filed: Apr. 13, 2018

(65) Prior Publication Data

US 2019/0319775 A1 Oct. 17, 2019

(51) Int. Cl.
*H04L 12/861* (2013.01)
*G06F 1/04* (2006.01)
*H04L 7/00* (2006.01)
*H04L 12/863* (2013.01)

(52) U.S. Cl.
CPC .......... *H04L 7/005* (2013.01); *H04L 47/6245* (2013.01)

(58) Field of Classification Search
None
See application file for complete search history.

(56) References Cited

U.S. PATENT DOCUMENTS

| | | | |
|---|---|---|---|
| 4,501,021 A | 2/1985 | Weiss | |
| 6,539,488 B1 | 3/2003 | Tota et al. | |
| 6,657,969 B1 | 12/2003 | Neuendorff et al. | |
| 6,992,975 B1 | 1/2006 | Daniel | |
| 7,149,186 B1 | 12/2006 | Hey | |
| 7,212,490 B1 | 5/2007 | Kao et al. | |
| 7,509,403 B1 | 3/2009 | Lee et al. | |
| 7,710,878 B1 | 5/2010 | Kubat et al. | |
| 2002/0089977 A1* | 7/2002 | Chang ................. | H04L 47/6225 370/386 |
| 2003/0067871 A1 | 4/2003 | Busi et al. | |
| 2005/0152382 A1 | 7/2005 | Stirling et al. | |

(Continued)

*Primary Examiner* — Duc T Duong
(74) *Attorney, Agent, or Firm* — Bever, Hoffman & Harms, LLP

(57) ABSTRACT

A plurality of synchronization FIFOs receive input data streams from corresponding transmitting agents. Data is written to the synchronization FIFOs based on write clock signals provided by the corresponding transmitting agents. An arbitration circuit reads data from the synchronization FIFOs based on an asynchronous local clock signal. A minimum number of entries ($S_{MIN}$) of each synchronization FIFO is specified by a number of entries required to synchronize the stored data to the local clock signal. $S_{MIN}$ may further be specified by: a number of entries required to store data during a threshold time period that a throughput of the input data streams may exceed a read data throughput enabled by the local clock signal; a number of entries required to store the data during a flow control response time; and a number of entries read from the synchronization FIFO during the threshold time period and the flow control response time.

23 Claims, 8 Drawing Sheets

(56) References Cited

U.S. PATENT DOCUMENTS

| | | | |
|---|---|---|---|
| 2006/0072027 A1* | 4/2006 | Shibayama | H04N 1/00307 |
| | | | 348/333.1 |
| 2007/0036022 A1 | 2/2007 | Song | |
| 2007/0255874 A1* | 11/2007 | Jennings | G06F 13/1642 |
| | | | 710/113 |
| 2010/0188972 A1 | 7/2010 | Knapp | |
| 2010/0268844 A1 | 10/2010 | Quinlan et al. | |
| 2010/0268977 A1* | 10/2010 | Chang | G06F 13/1673 |
| | | | 713/500 |
| 2011/0296110 A1* | 12/2011 | Lilly | G06F 13/1668 |
| | | | 711/118 |
| 2011/0320854 A1 | 12/2011 | Elrabaa | |
| 2014/0043343 A1* | 2/2014 | Iwai | G06T 1/60 |
| | | | 345/502 |
| 2015/0081934 A1* | 3/2015 | Gupta | G06F 13/00 |
| | | | 710/56 |
| 2018/0059183 A1* | 3/2018 | Maeda | G01R 31/318547 |

* cited by examiner

SYSTEM AND METHOD FOR ASYNCHRONOUS, MULTIPLE CLOCK DOMAIN DATA STREAMS COALESCING AND RESYNCHRONIZATION

FIELD OF THE INVENTION

The present invention relates to structures and methods for implementing Multiple Input to Single Output Resynchronization and Coalescing (MISORC).

BACKGROUND

In multiple-clock domain communication systems that transmit data between multiple agents, each agent may receive data from other agents operating at frequencies and phases different from its own. FIG. 1 illustrates a conventional multiple-clock domain communication system 100, which includes transmitting agents $10_1$, $10_2$ and $10_N$, each of which operates based on clock signals CLK_1, CLK_2 and CLK_N, respectively, which may have different frequencies and/or phases (i.e., are asynchronous).

Transmitting agents $10_1$, $10_2$ and $10_N$ provide J-bit write data values WD_1, WD_2 and WD_N, respectively, write enable control signals WC_1, WC_2 and WC_N, respectively, and clock signals CLK_1, CLK_2 and CLK_N, respectively, to FIFOs $30_1$, $30_2$ and $30_N$, respectively, within receiving agent 20. FIFOs $30_1$, $30_2$ and $30_N$ are controlled to buffer and resynchronize the received data WD_1, WD_2 and WD_N within receiving agent 20. More specifically, downstream processing unit 40 monitors the contents of FIFOs $30_1$, $30_2$ and $30_N$. In response, downstream processing unit 40 provides read enable control signals RC_1, RC_2 and RC_N (along with local clock signal CLK_P) to FIFOs $30_1$, $30_2$ and $30_N$, respectively, thereby initiating read accesses to FIFOs $30_1$, $30_2$ and $30_N$, wherein previously stored data values WD_1, WD_2 and WD_N are provided to downstream processing unit 40 in synchronism with the local clock signal CLK_P (which may have a different frequency/phase than clock signals CLK_1, CLK_2 and CLK_N). In response, downstream processing unit 40 provides an output data stream $D_{OUT}$.

Throughput (TP) is defined as the amount of data transferred through or processed by an agent over a given time. The receiving agent 20 has a maximum throughput of T. The peak throughput of each incoming data stream (WD_1, WD_2 and WD_N) can typically be as high as that of the output data stream $D_{OUT}$ (i.e., T), for predetermined limited time periods. Flow control circuitry 21 in the receiving agent 20 controls flow control circuitry $11_1$, $11_2$ and $11_N$ in transmitting agents $10_1$, $10_2$ and $10_N$, respectively, such that the average throughput of the transmitting agents $10_1$, $10_2$ and $10_N$ (i.e., the average throughput of the input data buses to FIFOs $30_1$, $30_2$ and $30_N$) is less than or equal to the maximum throughput T of receiving agent 20. For example, the flow control circuitry 21 may cause each of the flow control circuits $11_1$, $11_2$ and $11_N$ to limit the throughput of its corresponding data stream to an average throughput equal to the maximum throughput T of the receiving agent 20 divided by the number of incoming data streams, N. Although the average throughput of each of the incoming data streams is limited, it is possible that one or more of the incoming data streams may be providing write data at the maximum throughput T at the same time. At this time, one of the incoming data streams WD_1, WD_2 and WD_N may be temporarily allocated all of the transfer resources within the downstream processing unit 40, while the other incoming data stream(s) are buffered in their corresponding FIFOs.

The required number of entries ($K_1$, $K_2$ and $K_N$) in each of the FIFOs $30_1$, $30_2$ and $30_N$ is determined by several factors, including: the number of entries (A) required to resynchronize the (asynchronous) incoming data values with the local clock signal CLK_P; the number of entries (B) required to buffer incoming data values during the transient periods when the sum of the throughputs of the incoming data streams exceeds the maximum throughput (T) of the downstream processing unit 40; the number of entries (C) required to buffer the incoming data values for the duration of a worst case wait time ($T_{WAIT}$) associated with the downstream processing unit 40 (i.e., the maximum time allowed between the time data is written to a FIFO and the time downstream processing unit 40 must begin reading data from the FIFO); and the number of entries (D) required to buffer the incoming data values from the time the flow control circuitry 21 sends a flow control message, and the time the flow control circuitry $11_1$, $11_2$ and $11_N$ responds to the flow control message (e.g., by temporarily curtailing the transmission of data values).

The number of entries (A) is relatively small, and depends on the frequencies of the various clock signals CLK_1, CLK_2, CLK_N and CLK_P, as well as clock jitter and the set up and hold times of the memory used to implement the FIFOs $30_1$, $30_2$ and $30_N$.

The number of entries (B) depends on the frequencies of the various clock signals CLK_1, CLK_2, CLK_N and CLK_P, as well as the flow control methods implemented by flow control circuitry 21, and in particular, on the allowed durations of the temporary periods during which the sum of the throughputs of the incoming data streams may temporarily exceed the maximum throughput of the downstream processing unit 40.

The number of entries (C) is typically relatively large, and depends on the worst case wait time ($T_{WAIT}$) allowable before the downstream processing unit 40 must start reading data previously stored in the FIFOs $30_1$, $30_2$ and $30_N$. Note that if the worst case wait time ($T_{WAIT}$) of one of the FIFOs $30_1$, $30_2$ and $30_N$ elapses without previously stored data being transmitted from this FIFO, flow control circuitry 21 will transmit a back-off message to the flow control circuitry of the associated transmitting agent, instructing this transmitting agent to temporarily stop transmitting data to receiving agent 20. The worst case wait time $T_{WAIT}$ requires an additional C=$T_{WAIT}$*T entries in each of the FIFOs $30_1$, $30_2$ and $30_N$. The worst case wait time $T_{WAIT}$ is defined by the required operations of the downstream processing unit 40, and typically requires hundreds or thousands of entries within each of the FIFOs $30_1$-$30_N$.

The number of entries (D) is typically smaller than the number of entries (C), and depends on the time that elapses between the time the flow control circuitry 21 transmits a back-off message to a transmitting agent, and the time that the transmitting agent responds to the back-off message by stopping data transmission. This time period is referred to as the flow control response time ($T_F$), which requires an additional D=$T_F$*T entries in each of the FIFOs $30_1$, $30_2$ and $30_N$.

Depending on system requirements and agent design limitations, the FIFO depth requirements of FIFOs $30_1$, $30_2$ and $30_N$ (i.e., the required number of entries, $K_1$, $K_2$ and $K_N$ for FIFOs $30_1$, $30_2$ and $30_N$, respectively) may be very large (e.g., hundreds or thousands of entries for each FIFO). This is an inefficient use of FIFO resources, just to cover a worst case possibility. It would therefore be desirable to reduce the required depths of FIFOs $30_1$, $30_2$ and $30_N$.

Depending on system requirements and agent design limitations, the distances between transmitting agents $10_1$, $10_2$ and $10_N$ and receiving agent 20 may be relatively long. Similarly, long routes may exist between FIFOs $30_1$, $30_2$ and $30_N$ and downstream processing unit 40. The long routes described above require that the associated buses (e.g., the buses between transmitting agents $10_1$, $10_2$ and $10_N$ and FIFOs $30_1$, $30_2$ and $30_N$, and the buses between FIFOs $30_1$, $30_2$ and $30_N$ and downstream processing unit 40) are implemented in the multi-layer metal interconnect structure of the associated integrated circuit chip. Note that each of the buses between FIFOs $30_1$, $30_2$ and $30_N$ and downstream processing unit 40 must be designed to meet the maximum throughput T of downstream processing unit 40. This is an inefficient use of the available interconnect resources, and can result in the design of communication system 100 becoming impractical due to performance, routing and die size constraints. It would therefore be desirable to reduce the number/length of buses of communication system 100 that must be implemented using the multi-layer metal interconnect resources of an integrated circuit chip.

SUMMARY

Accordingly, the present invention provides a communication system that includes a plurality of synchronization FIFOs, each coupled to receive a corresponding input data stream and corresponding write clock/enable signals from a corresponding transmitting agent. Each of the write clock/enable signals can be asynchronous with respect to each of the other write/clock enable signals. An arbitration circuit reads data stored in the plurality of synchronization FIFOs in response to a local clock signal. The local clock signal may have a frequency at least as high as the highest frequency of the write clock signals received by the synchronization FIFOs.

In accordance with a first embodiment, each of the plurality of synchronization FIFOs includes a minimum number of entries ($S_{MIN}$) specified by a number of entries required to synchronize the data stored in the synchronization FIFO to the local clock signal.

In accordance with a second embodiment, each of the synchronization FIFOs includes a minimum number of entries ($S_{MIN}$) specified by: a number of entries required to synchronize the data stored in the synchronization FIFO to the local clock signal; a number of entries required to store the data in the synchronization FIFO during a threshold time period that a combined data throughput of the transmitting agents is allowed to exceed a read data throughput enabled by the local clock signal; a number of entries required to store the data in the synchronization FIFO during a flow control response time required to stop data from being provided to the synchronization FIFO by the corresponding transmitting agent; and a number of entries read from the synchronization FIFO during the threshold time period and the flow control response time.

Advantageously, the minimum number of entries ($S_{MIN}$) required by both the first and second embodiments is significantly lower than the minimum number of entries required by the conventional FIFOs $30_1$-$30_N$ of the prior art.

A buffer FIFO memory is coupled to receive and store the data read by the arbitration circuit from the plurality of synchronization FIFO memories, wherein the buffer FIFO operates in response to the local clock signal. A downstream processing unit retrieves data from the buffer FIFO memory in response to the local clock signal at a maximum throughput. Flow control circuitry may control each input data stream to have a throughput less than or equal to the maximum throughput. In another example, flow control circuitry may limit the average throughput of the input data streams to be less than or equal to the maximum throughput.

Advantageously, only one data bus is required between the arbitration circuit and the buffer FIFO memory, thereby advantageously reducing routing congestion on the associated integrated circuit chip.

The communication system of the present invention can be used in various applications, including the transfer of data associated with ring networks. In a first application, a first synchronization FIFO memory of the plurality of synchronization FIFO memories is coupled to receive a first input data stream and a first clock signal from a first direction on a first bidirectional ring network, and a second synchronization FIFO memory of the plurality of synchronization FIFO memories is coupled to receive a second input data stream and a second clock signal from a second direction on the first bidirectional ring network.

In a second application, a first synchronization FIFO memory of the plurality of synchronization FIFO memories is coupled to receive a first input data stream and a first clock signal from a first ring network, and a second synchronization FIFO memory of the plurality of synchronization FIFO memories is coupled to receive a second input data stream and a second clock signal from a second ring network.

In accordance with another embodiment, a method includes: receiving a plurality of input data streams and corresponding input clock signals from a corresponding plurality of transmitting agents; storing each of the plurality of input data streams in a corresponding synchronization FIFO memory in response to the corresponding input clock signal; arbitrating the reading of data from each synchronization FIFO memory, wherein data is read from each synchronization FIFO memory in response to a local clock signal, wherein the local clock signal is asynchronous with respect to the input clock signals; storing the data read from each synchronization FIFO memory in a buffer FIFO memory, wherein the buffer FIFO operates in response to the local clock signal; and transferring data from the buffer FIFO memory to a downstream processing unit in response to the local clock signal.

The present invention will be more fully understood in view of the following description and drawings.

DETAILED DESCRIPTION

Figure 1:
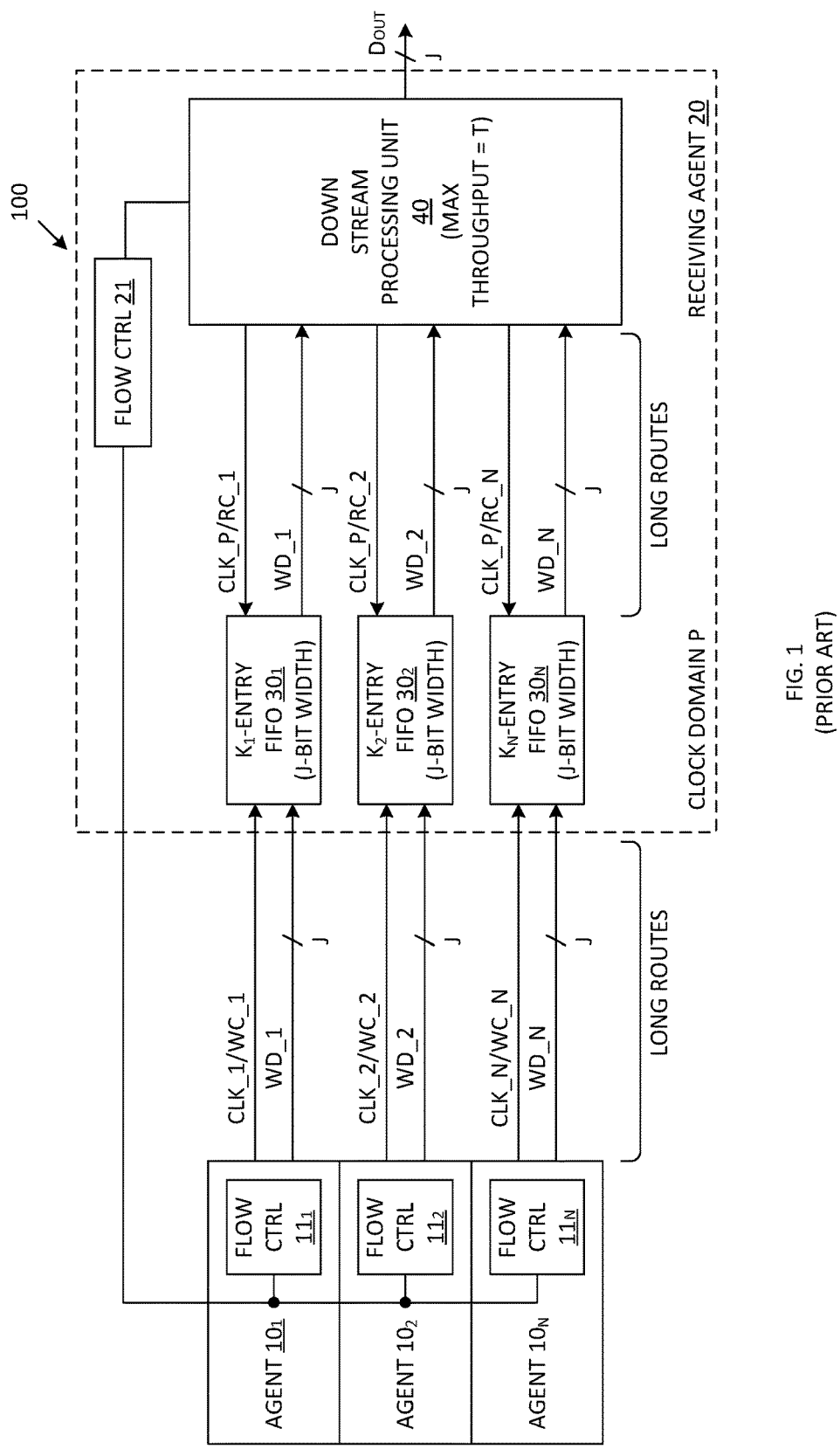
FIG. 1 is a block diagram of a conventional multi-clock domain communication system including a plurality of transmitting agents and a receiving agent having a plurality of deep FIFO memories.

The present invention provides an efficient Multiple Input to Single Output Resynchronization and Coalescing (MISORC) method and structure for merging multiple-clock domain input data streams to a single output data stream. The method can be used to aggregate multiple data buses into a single data bus in a manner that reduces on-chip wire count, potentially reducing routing congestion, as well as minimizing the amount of FIFO resources used for resynchronization and buffering.

In accordance with the present invention, the receiving FIFOs $30_1$-$30_N$ of the conventional receiving agent 20 are replaced with a plurality of relatively small synchronization FIFOs and one larger downstream buffer FIFO. In a first embodiment, each synchronization FIFO is sized to include only the number of entries (A) required to handle resynchronization. In a second embodiment, each synchronization FIFO is sized to include only the number of entries (A) required to handle resynchronization, a number of entries (B) required to buffer incoming data values during the transient periods when the sum of the throughputs of the incoming data streams exceeds the maximum throughput (T) of the downstream processing unit, and the number of entries (D) required to handle a flow control response time.

Advantageously, in the first embodiment, each synchronization FIFO does not need to include the number of entries (B) required to buffer incoming data values during the transient periods when the sum of the throughputs of the incoming data streams exceeds the maximum throughput (T) of the downstream processing unit, the number of entries (C) required to handle worst case wait time ($T_{WAIT}$) and the number of entries (D) required to handle flow control response time ($T_F$). Similarly, in the second embodiment, each synchronization FIFO does not need to include the number of entries (C) required to handle worst case wait time ($T_{WAIT}$). As described above, the number of entries (C) and (D) typically account for the largest storage requirements of conventional FIFOs $30_1$, $30_2$ and $30_N$. Each synchronization FIFO of the present invention therefore typically includes a significantly fewer number of entries than the conventional FIFOs $30_1$, $30_2$ and $30_N$.

At every clock cycle of the receiving agent's clock domain, an arbitration circuit selects a valid entry from one of the synchronization FIFOs' read ports to upload into a common buffer FIFO (or other memory structure). This common buffer FIFO is sized to meet the requirements of the downstream processing unit (e.g., includes enough entries to cover the worst case wait time $T_{WAIT}$). In one embodiment, the buffer FIFO is sized to be able to store a number of entries (C') required by a worst case wait time ($T_{W'}$) that may elapse from the time that data is stored in the common buffer FIFO until the data must be read from the common buffer FIFO, and a number of entries (D') required by a flow control response time ($T_{F'}$) that may elapse from the time a back-off message is transmitted by flow control circuitry of the receiving agent unit and the time that the corresponding transmitting agent stops transmitting data in response to the back-off message.

The arbitration circuit is designed to meet the requirements of the system. The arbitration circuit, for example, can use one or a combination of the following selection mechanisms for uploading data from the receiving FIFOs to the downstream processing unit: data stream order, turn, and fullness of the FIFOs. Other arbitration policies can be used in other embodiments. It is noted that the arbitration policy can be designed to be modifiable during operation of the system. The arbitration circuit selects one entry per cycle at the maximum transfer rate from among the synchronization FIFOs to be loaded into the larger buffer FIFO. Advantageously, only one data bus having the maximum throughput (T) is required between the arbitration circuit and the common buffer FIFO, thereby minimizing routing congestion of the system. MISORC structures and methods in accordance with the present invention will now be described in more detail.

Figure 2A:
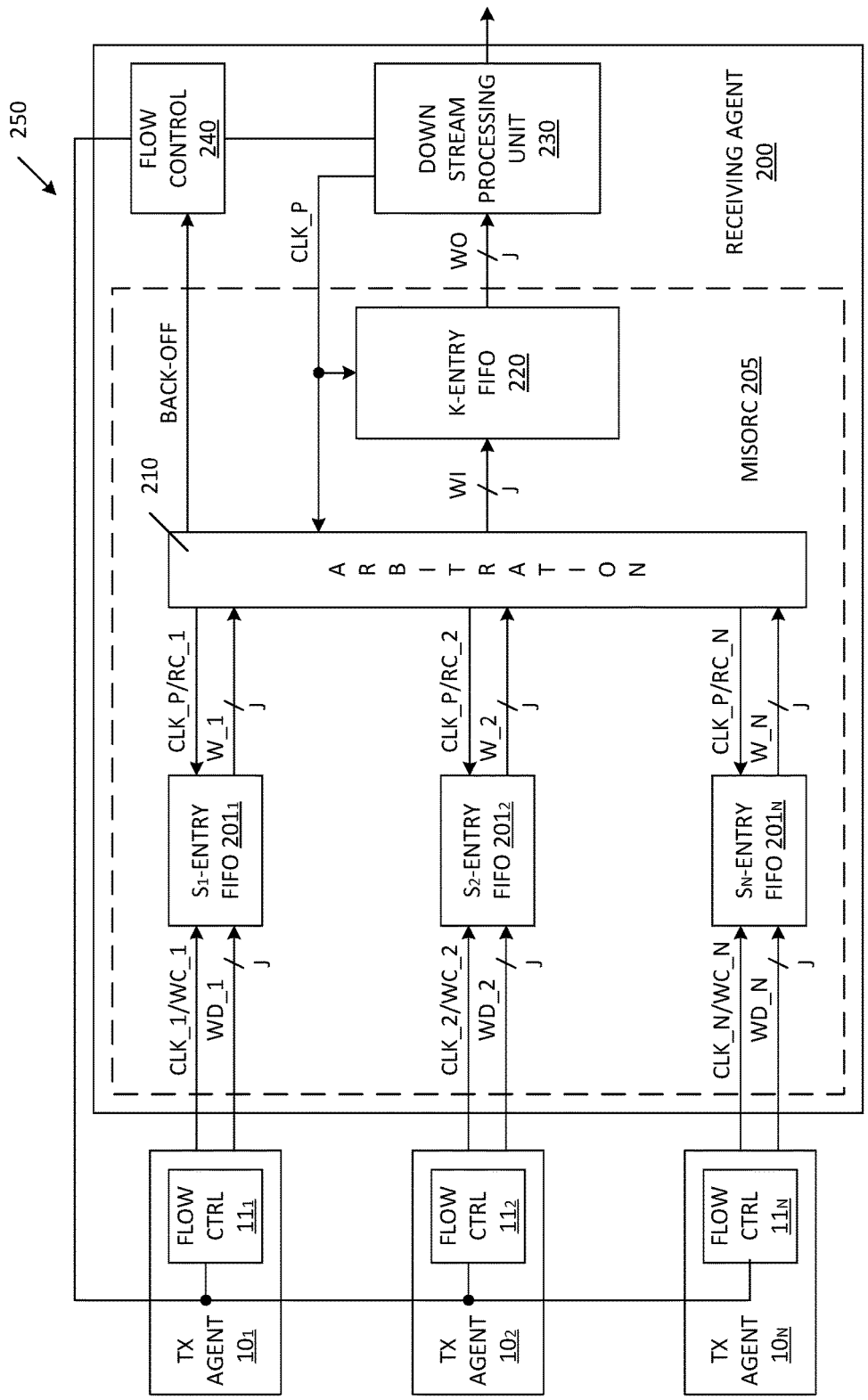
FIG. 2A is a block diagram illustrating a multi-clock domain communication system including a plurality of transmitting agents and a multiple-clock domain receiving agent in accordance with one embodiment of the present invention.

FIG. 2A is a block diagram illustrating a communication system 250 including a plurality of transmitting agents $10_1$, $10_2$ and $10_N$ and a multiple-clock domain receiving agent 200 in accordance with one embodiment of the present invention. In the illustrated example, receiving agent 200 is coupled to the transmitting agents $10_1$, $10_2$ and $10_N$, which have been described above. Receiving agent 200 includes MISORC circuit 205, downstream processing unit 230 and flow control unit 240. Flow control unit 240 controls the flow control units $11_1$, $11_2$ and $11_N$ of transmitting agents $10_1$, $10_2$ and $10_N$ to limit the average data flow of these transmitting agents to a predetermined threshold (i.e., the maximum throughput T of downstream processing unit 230). Although a single line is shown connecting flow control unit 240 to flow control units $11_1$, $11_2$ and $11_N$, it is understood that separate lines can be provided from the flow control unit 240 to each of the flow control units $11_1$, $11_2$ and $11_N$.

MISORC circuit 205 includes N synchronization FIFOs $201_1$, $201_2$ and $201_N$, arbitration circuit 210 and K-entry buffer FIFO 220. Each of synchronization FIFOs $201_1$, $201_2$ and $201_N$ receives incoming J-bit write data values WD_1, WD_2 and WD_N, respectively, on write data buses. In one embodiment, each of these write data buses has a maximum throughput no greater than T, wherein T is the maximum throughput exhibited by the downstream processing unit 230. In an alternate embodiment, the peak throughput of each of these write data buses can be greater than the maximum throughput T of the downstream processing unit 230 for a limited duration, as long as the average throughput of each write data bus, as well as the average of the sum of the throughputs of all the write data buses is less than T. In this embodiment, each of the synchronization FIFOs $201_1$, $201_2$ and $201_N$ is sized to be able to buffer write data for the maximum duration of the peak throughput, relative to the maximum throughput T. The write data buses can be operated at different clock frequencies and phases in the manner described above. Although the write data buses have the same width (J) in the described examples, it is understood that the write data buses can have different widths (as long as the throughputs on these write data buses are controlled in the manner described herein). In one embodiment, each of the write clock signals CLK_1, CLK_2 and CLK_N has the same frequency, but these write clock signals CLK_1, CLK_2 and CLK_N have no determined phase relationship with one another (i.e., are asynchronous). In other embodiments, the write clock signals CLK_1, CLK_2 and CLK_N can have different frequencies (as long as the throughputs on these write data busses are controlled in the manner described herein). Arbitration circuit 210 controls the transfer of J-bit write data values W_1, W_2 and W_N from synchronization FIFOs $201_1$, $201_2$ and $201_N$, respectively, to K-entry buffer FIFO 220 (as J-bit input write data WI). More specifically, arbitration circuit 210 provides read enable signals RC_1, RC_2 and RC_N to synchronization FIFOs $201_1$, $201_2$ and $201_N$, respectively, thereby causing the data values W_1, W_2 and W_N to be read. In the embodiment of FIG. 2A, the read enable signals RC_1, RC_2 and RC_N are clocked by the local clock signal CLK_P. Input write data values WI provided by arbitration circuit 210 are written to K-entry buffer FIFO 220 with a maximum throughput equal to T. The write data values are subsequently read from K-entry FIFO 220 by downstream processing unit 230 (e.g., as J-bit output write data values WO) with a maximum throughput equal to T. Arbitration circuit 210 also provides back-off messages to flow control circuit 240 in a manner described in more detail below. Flow control circuit 240 forwards the back-off messages to the appropriate flow control circuits $11_1$, $11_2$ and/or $11_N$ in a manner described in more detail below, wherein the flow control circuits $11_1$, $11_2$ and/or $11_N$ temporarily stop the transmission of data from the corresponding transmitting agents $10_1$, $10_2$ and/or $10_N$ in response to the received back-off message(s).

Synchronization FIFOs $201_1$, $201_2$ and $201_N$ include $S_1$, $S_2$ and $S_N$ entries, respectively. In a first embodiment, the number of entries (i.e., $S_1$, $S_2$ and $S_N$) used in the synchronization FIFOs $201_1$, $201_2$ and $201_N$ for the incoming write data streams WD_1, WD_2 and WD_N are calculated to enable these synchronization FIFOs $201_1$, $201_2$ and $201_N$ to just support the resynchronization of data between the incoming (write) clock signals CLK_1, CLK_2 and CLK_N, respectively, and the local clock signal (CLK_P) of receiving agent 200/downstream processing unit 230. In this embodiment, synchronization FIFOs $201_1$, $201_2$ and $201_N$ include $S_1$, $S_2$ and $S_N$ entries that generally include the number of entries (A) required for resynchronization described above in connection with the receiving agent 20 of FIG. 1.

In a second embodiment, the number of entries (i.e., $S_1$, $S_2$ and $S_N$) used in the synchronization FIFOs $201_1$, $201_2$ and $201_N$ additionally include entries to support the buffering of incoming write data values during transient periods when the sum of the throughputs of the incoming data streams temporarily exceeds the maximum throughput (T) of the downstream processing unit 230 (in accordance with the implemented flow control), and the buffering of incoming write data values during the flow control response time associated with flow control circuitry 240 and $11_1$-$11_N$. In this embodiment, synchronization FIFOs $201_1$, $201_2$ and $201_N$ include $S_1$, $S_2$ and $S_N$ entries that generally include (A), (B) and (D) type entries described above in connection with the receiving agent 20 of FIG. 1.

Unlike in the conventional receiving agent 20 (FIG. 1), the number of entries $S_1$, $S_2$ and $S_N$ of synchronization FIFOs $201_1$, $201_2$ and $201_N$ do not need to include the number of entries (C) required to handle the worst case wait time ($T_{WAIT}$) associated with the downstream processing unit 230 (and may not need to include the number of entries (B) required to handle periods wherein the write data rate exceeds the read data rate, and the number of entries (D) required to handle flow control response time ($T_F$)). Thus, the number of entries $S_1$, $S_2$ and $S_N$ of synchronization FIFOs $201_1$, $201_2$ and $201_N$ are much less than the number of entries $K_1$, $K_2$ and $K_N$ required by conventional FIFOs $30_1$-$30_N$ (FIG. 1). Note that the number of entries $S_1$, $S_2$ and $S_N$ in each of the synchronization FIFOs $201_1$, $201_2$ and $201_N$ do not need to be the same.

In accordance with one embodiment, the minimum number of entries $S_{MIN}$ for each of the synchronization FIFOs $201_1$, $201_2$ and $201_N$ is defined conservatively by the following equation.

$$S_{MIN} = \text{round\_up}((\text{RCLK\_PERIOD} + T_{nv})/\text{WCLK\_PERIOD}) + \text{round\_up}(E_d) + \text{round\_up}(E_t) + \text{round\_Up}(E_f) - \text{round\_down}(E_c)$$

wherein round_up indicates a rounding up operation to the nearest integer; round_down indicates a rounding down operation to the nearest integer; RCLK_PERIOD is the period of the read enable signal used to read data from the synchronization FIFO (e.g., the period of read enable signals RC_1, RC_2 or RC_N) (as determined by the arbitration circuit 210, which is operating at frequency CLK_P); WCLK_PERIOD is the period of the write enable signal used to write data into the synchronization FIFO (e.g., the period of write enable control signals WC_1, WC_2 or WC_N); $T_{nv}$ is sum of the setup time ($T_{su}$) of the flip-flops used to store data in the synchronization FIFO, the hold time ($T_{hold}$) of the flip-flops used to store data in the synchronization FIFO, and the clock jitter ($T_J$) of the clock signals used to write and read data from the synchronization FIFO; $E_d$ is equal to (L*(CLK_P PERIOD/WCLK_PERIOD)), where L is the number of CLK_P periods elapsed between the detection of a next available FIFO entry to be read and the time that the detected entry is actually read from the FIFO (wherein L is typically 1 or 2, at most); $E_t$ is equal to $T_{wgr}$/WCLK_PERIOD, wherein $T_{wgr}$ is the amount of time during which the throughput of the data values written to the synchronization FIFO may exceed the read throughput of the synchronization FIFO during a flow control cycle (based on the flow control method implemented by flow control circuitry 240); $E_f$ is equal to $T_F$/WCLK_PERIOD, wherein $T_F$ is defined as the flow control response time that elapses between the time the arbitration circuit 210 transmits a back-off message (BACK-OFF) and the time that the corresponding synchronization FIFO stops receiving write data in response to the back-off message; and $E_c$ is equal to $(T_{wgr}+T_F)$/RCLK_PERIOD.

In general, the value of [round_up((RCLK_PERIOD+ $T_{nv}$)/WCLK_PERIOD)+round_up ($E_d$)] represents the number of entries required to resynchronize the asynchronous write data to the local clock signal CLK_P. The value of round_up($E_t$) represents the number of entries required to store data values during the time period $T_{wgr}$ that the combined write data throughputs are allowed to exceed the read data throughput. The value of round_up($E_f$) represents the number of entries required to store data values during the flow control response time. The value of round_down($E_c$) represents the number of entries read from the synchronization FIFO during the time periods $T_{wgr}$ and $T_F$.

Note that the synchronization FIFO read mechanism is specified by the arbitration circuit 210, and not directly by the local clock signal CLK_P. The arbitration circuit 210 is driven by the local clock signal CLK_P. The best case (temporary) read frequency of any particular synchronization FIFO is the frequency of the local clock signal CLK_P, since the arbitration circuit 210 is clocked by the local clock signal CLK_P. The worst case read (temporary) frequency of any particular synchronization FIFO is 0 or a very low frequency, as determined by arbitration circuit 210. The frequency at which a synchronization FIFO is read may therefore be less than the frequency of the local clock signal CLK_P.

If the period of the read enable signal (RCLK_PERIOD) is less than the period of the write enable signal (WCLK_PERIOD) minus the $T_{nv}$ value for a synchronization FIFO, then the values of $T_{wgr}$ and $T_F$ are equal to zero (because the write data throughput will not exceed the read data throughput, and the arbitration circuit 210 will not need to transmit a back-off message). Assuming that L=1, then the minimum entry requirement $S_{MIN}$ of the synchronization FIFO is equal to 2 entries under these conditions (i.e., $S_{MIN}$=1+1+0+0-0=2 in accordance with the equation provided above).

If the period of the read enable signal (RCLK_PERIOD) is equal to the period of the write enable signal (WCLK_PERIOD) for a synchronization FIFO, then $T_{wgr}$ and $T_f$ are equal to zero (because the write data throughput will not exceed the read data throughput, and the arbitration circuit 210 will not need to transmit a back-off message). Assuming the value of $T_{nv}$ is significantly less than the read and write clock periods, and that L=1, the minimum entry requirement $S_{MIN}$ is equal to 3 entries under these conditions (i.e., $S_{MIN}$=2+1+0+0-0=3 in accordance with the equation provided above).

If the period of the read enable signal (RCLK_PERIOD) is greater than the period of the write enable signal (WCLK_PERIOD) for a synchronization FIFO, the entry requirement of the synchronization FIFO can be infinite, if this condition is not transient. Consequently, the minimum entry requirement $S_{MIN}$ is determined according to the above equation, which takes into account the amount of time ($T_{wrg}$) the write throughput is allowed to exceed the read throughput and the flow response time ($T_F$). Several examples are provided below.

In accordance with a first embodiment, assume the write clocks CLK_1, CLK_2 and CLK_N have frequencies of 1 GHz, 1 GHz and 2 GHz, respectively, the local clock signal CLK_P has a frequency of 2 GHz, and the $T_{nv}$ value ($T_{SU}$+$T_{HOLD}$ $T_j$) of the synchronization FIFOs $201_1$, $201_2$ and $201_N$ is 50 picoseconds (ps). Further assume that flow control circuit 240 controls the incoming data streams such that each of the transmitting agents $10_1$ and $10_2$ is allowed to transmit one data value every four cycles of the local clock signal CLK_P, and the transmitting agent $10_N$ is allowed to transmit two data values every four cycles of the local clock signal P, and that accordingly, the arbitration circuit 210 response results in one read operation from each of the synchronization FIFOs $201_1$ and $201_2$ every four cycles of the CLK_P signal, and two read operations from the synchronization FIFO $201_N$ every four cycles of the CLK_P signal, such that RCLK_PERIOD=2000 ps for FIFOs $201_1$ and $201_2$, RCLK_PERIOD=1000 ps for FIFO $201_N$, WCLK_PERIOD=2000 ps for FIFOs $201_1$ and $201_2$, WCLK_PERIOD=1000 ps for FIFO $201_N$, CLK_P period=500 ps, $T_{wgr}$=0 (i.e., the sum of the throughputs of the data values written to synchronization FIFOs $201_1$, $201_2$ and $201_N$ never exceed the maximum throughput T of the arbitrator 210 and the downstream processing unit 230) and TF=0 (i.e., the arbitration circuit 210 does not need to transmit back-off messages). In this example, each of the synchronization FIFOs $201_1$, $201_2$ and $201_N$ may include 3 entries. More specifically, in accordance with the equation provided above (assuming L=1), the minimum required number of entries of synchronization FIFOs $201_1$ and $201_2$ are: round_up((2000 ps+50 ps)/2000 ps)+round_up(1*(500 ps/2000 ps))+round_up(0ps/2000 ps)+round_up(0ps/2000 ps) −round_down(0ps/2000 ps)=2+1+0+0−0=3. Similarly, the minimum required number of entries of synchronization FIFO $201_N$ is: round_up((1000 ps+50 ps)/1000 ps)+round_up(1*(500 ps/1000 ps))+round_up(0ps/1000 ps)+round_up(0ps/1000 ps)−round_down(0ps/1000 ps)=2+1+0+0−0=3.

In accordance with another example of the first embodiment, assume the write clocks CLK_1, CLK_2 and CLK_N have frequencies of 2 GHz, 2 GHz and 2 GHz, respectively, the local clock signal CLK_P has a frequency of 2 GHz, and the $T_{nv}$ value ($T_{SU}$+$T_{HOLD}$+$T_j$) of the synchronization FIFOs $201_1$, $201_2$ and $201_N$ is 50 ps. Further assume that flow control circuit 240 controls the incoming data streams such that each of the transmitting agents $10_1$-$10_N$ is allowed to transmit one data value every three cycles of the local clock signal CLK_P, and that accordingly, the arbitration circuit 210 response results in one read operation from each of the synchronization FIFOs $201_1$ and $201_2$ and $201_N$ every three cycles of the CLK_P signal, such that RCLK_PERIOD=1500 ps, WCLK_PERIOD=1500 ps, CLK_P PERIOD=500 ps, $T_{wgr}$=0 (i.e., the sum of the throughputs of the data values written to synchronization FIFOs $201_1$, $201_2$ and $201_N$ never exceed the maximum throughput T of the arbitrator 210 and the downstream processing unit 230) and $T_F$=0 (i.e., the arbitration circuit 210 does not need to transmit back-off messages). In this example, each of the synchronization FIFOs $201_1$, $201_2$ and $201_N$ may include 3 entries. More specifically, in accordance with the equation provided above (assuming L=1), the minimum required number of entries of synchronization FIFOs $201_1$, $201_2$ and $201_N$ are: round_up((1500 ps+50 ps)/1500 ps)+round_up(1*(500 ps/1500 ps))+round_up(0ps/1500 ps)+round_up(0ps/1500 ps)−round_down(0ps/1500 ps)=2+1+0+0−0=3.

In accordance with a second embodiment, assume the write clocks CLK_1, CLK_2 and CLK_N have frequencies of 1 GHz, 1 GHz and 2 GHz, respectively, the local clock signal CLK_P has a frequency of 2 GHz, and the $T_{nv}$ value ($T_{su}$+$T_{HOLD}$+$T_j$) of the synchronization FIFOs $201_1$, $201_2$ and $201_N$ is 50 ps. Further assume that flow control circuit 240 controls the incoming data streams such that each of the transmitting agents $10_1$ and $10_2$ is allowed to transmit data with an average throughput of one data value every four cycles of the local clock signal CLK_P, and the transmitting agent $10_N$ is allowed to transmit data with an average throughput of two data values every four cycles of the local clock signal P. Further assume that the combined throughputs of the transmitting agents $10_1$, $10_2$ and $10_N$ are allowed to exceed the maximum throughput T of the downstream processing unit 230 for a duration of $T_{gwr}$=20000 ps and that the flow control response time $T_F$ is 5000 ps. Note that the minimum write clock period (WCLK_PERIOD) for synchronization FIFOs $201_1$ and $201_2$ is 1000 ps (for a limited duration), and that the minimum write clock period (WCLK_PERIOD) for synchronization FIFO $201_N$ is 500 ps (for a limited duration) in this example. On average, the arbitration circuit 210 response results in one read operation from each of the synchronization FIFOs $201_1$ and $201_2$ every four cycles of the CLK_P signal (for a RCLK_PE- RIOD=2000 ps), and two read operations from the synchronization FIFO $201_N$ every four cycles of the CLK_P signal (for a RCLK_PERIOD=1000 ps). In this example, each of the synchronization FIFOs $201_1$ and $201_2$ may include 17 entries and synchronization FIFO $201_N$ may include 29 entries. More specifically, in accordance with the equation provided above (assuming L=1), the minimum required number of entries of synchronization FIFOs $201_1$ and $201_2$ are: round_up((2000 ps+50 ps)/1000 ps)+round_up(1*(500 ps/1000 ps))+round_up(20000 ps/1000 ps)+round_up(5000 ps/1000 ps)−round_down(25000 ps/2000 ps)=3+1+20+5−12=17. Similarly, the minimum required number of entries of synchronization FIFO $201_N$ is: round_up((1000 ps+50 ps)/500 ps)+round_up(1*(500 ps/500 ps))+round_up(20000 ps/500 ps)+round_up(5000 ps/500 ps)−round_down(25000 ps/1000 ps)=3+1+40+10−25=29.

In yet another example in accordance with the second embodiment, assume each the write clocks CLK_1, CLK_2 and CLK_N has a frequency of 2 GHz, the local clock signal CLK_P has a frequency of 2 GHz, and the $T_{nv}$ value ($T_{su}+T_{HOLD}+T_j$) of the synchronization FIFOs $201_1$, $201_2$ and $201_N$ is 50 ps. Further assume that flow control circuit 240 controls the incoming data streams such that each of the transmitting agents $10_1$, $10_2$ and $10_N$ is allowed to transmit data with an average throughput of one data value every three cycles of the local clock signal CLK_P. Further assume that the combined throughputs of the transmitting agents $10_1$, $10_2$ and $10_N$ are allowed to exceed the maximum throughput T of the downstream processing unit 230 for a duration of $T_{gwr}$=20000 ps and that the flow control response time $T_F$ is 5000 ps. Note that the minimum write clock period (WCLK_PERIOD) for synchronization FIFOs $201_1$, $201_2$ and $201_N$ is 500 ps (for a limited duration) in this example. On average, the arbitration circuit 210 response results in one read operation from each of the synchronization FIFOs $201_1$, $201_2$ and $201_N$ every three cycles of the CLK_P signal (for a RCLK_PERIOD=1500 ps). In this example, each of the synchronization FIFOs $201_1$, $201_2$ and $201_N$ may include 39 entries. More specifically, in accordance with the equation provided above (assuming L=1), the minimum required number of entries for each of synchronization FIFOs $201_1$, $201_2$ and $201_N$ is: round_up((1500 ps+50 ps)/500 ps)+round_up(1*(500 ps/500 ps))+round_up (20000 ps/500 ps)+round_up(5000 ps/500 ps)−round_down (25000 ps/1500 ps)=4+1+40+10−16=39.

In the manner described above, the value of $T_{gwr}$ effectively defines a threshold number of entries ($E_{TH}$) in the corresponding synchronization FIFOs, wherein when a synchronization FIFO is filled to its threshold number of entries, the arbitration circuit 210 asserts a back-off message (BACK-OFF), which is transmitted to flow control circuitry 240. In response, flow control circuitry 240 transmits the back-off message to the flow control circuits $11_1$, $11_2$ and/or $11_N$ associated with the synchronization FIFO that was filled to the threshold number of entries. In response, this flow control circuit $11_1$, $11_2$ or $11_N$ (temporarily) stops transmitting data to its corresponding synchronization FIFO, allowing time for data to be read from the synchronization FIFO. In this manner, the flow control scheme allows the input data streams WD_1, WD_2 and WD_N to be transmitted unregulated at their respective clock rates CLK_1, CLK_2 and CLK_N, until the respective synchronization FIFOs $201_1$, $201_2$ and $201_N$ are filled to the predetermined number of threshold entries ($E_{TH}$). The predetermined numbers of threshold entries are selected to allow the transmitting agents $10_1$, $10_2$ or $10_N$ to temporarily transmit data at the full data rates allowed by their corresponding clock signals CLK_1, CLK2 and CLK_N. In one embodiment, the predetermined number of threshold entries is on the order of 10 entries or less. In another embodiment, the predetermined number of threshold entries is 64 or less. In yet another embodiment, the predetermined number of threshold entries is 128 entries or less. In each embodiment, the minimum number of entries of the synchronizing FIFOs $201_1$-$201_N$ is significantly less than the minimum number of entries required by conventional buffer FIFOs $30_1$-$30_N$. Merging the multiple input data streams into a single input data stream WI in the manner described herein ensures that the minimum number of entries of the synchronizing FIFOs $201_1$-$201_N$ is significantly less than the minimum number of entries required by conventional buffer FIFOs $30_1$-$30_N$.

In a particular embodiment, the frequency of the downstream processing unit 230 (CLK_P) is equal to or greater than maximum clock frequency of the incoming write clocks (WC_1, WC_2, WC_N), to provide for a minimum number of synchronization FIFO entries and to maintain the use of a uniform data width along the data path, resulting in less circuit complexity.

Arbitration circuit 210 will select one valid data value every cycle of the local clock signal CLK_P from one of the N synchronization FIFOs $201_1$-$201_N$, and write this valid data value to K-entry buffer FIFO 220. Note that data transfers from each of the synchronization FIFOs $201_1$, $201_2$ and $201_N$ to arbitration circuit 210 can have a maximum throughput equal to T, and that data transfers from arbitration circuit 210 to buffer FIFO 220 (WI) also have a maximum throughput equal to T. Data transfers from buffer FIFO 220 to downstream processing unit 230 also have a maximum throughput equal to T.

Although buffer FIFO 220 is illustrated as a separate memory device within the MISORC circuit 205, it is understood that buffer FIFO 220 can be implemented in downstream processing unit 230, or be merged with other memory structures in the processing unit in other embodiments.

In accordance with one embodiment, the number of entries (K) required by buffer FIFO 220 is determined by several factors, including: the latency of the downstream processing unit 230 and the delay that exists between the time the flow control circuitry 240 sends a flow control message, and the time the flow control circuitry $11_1$, $11_2$ and $11_N$ responds to the flow control message (e.g., by temporarily curtailing the transmission of data values).

For example, assume a router or switch includes multiple input ports that transmit data to the same output port, which then forwards the data to other ports. Data received from the input ports must be buffered because not all data from the input ports can be redirected simultaneously. This data will occupy part of the buffer FIFO 220 entries. When the buffer FIFO 220 fills to a certain point, flow control circuitry 240 must transmit a back-off message to slow or stop data transmission from transmitting agents $10_1$, $10_2$ and $10_N$. Buffer FIFO 220 must have the capacity to store all data that is transmitted by the transmitting agents $10_2$, $10_2$ and $10_N$ until these transmitting agents slow or stop transmission in response to receiving the back-off message. The number of entries can be large or small depending on the time it takes for the transmitting agents to receive the back-off message and the frequency of operation. For example, the response may take hundreds of cycles if the transmitting frequency is high and the transmitting agents are located off-chip. If the transmitting agents are located on-chip, the flow control response may require a few to tens of cycles.

More specifically, the buffer FIFO 220 must include a depth (of C' entries) that accounts for the worst case wait time ($T_W'$) allowable before the buffer FIFO 220 must start reading previously stored data values. Note that if the worst case wait time ($T_W'$) of the buffer FIFO 220 elapses without previously stored data being transmitted from this buffer FIFO, flow control circuitry 240 will transmit a back-off message to the flow control circuitry of the transmitting agents $10_2$, $10_2$ and $10_N$, instructing these transmitting agents to temporarily stop transmitting data to receiving agent 200. The worst case wait time $T_{W'}$ requires $C'=T_{W'}*T$ entries in buffer FIFO 220. In addition, buffer FIFO 220 must have an additional depth (of D' entries) that allows data to be stored during the time that elapses between the time the flow control circuitry 240 transmits a back-off message to the transmitting agents, and the time that the transmitting agents respond to the back-off message by stopping data transmission. This time period is referred to as the flow control response time ($T_F'$), which requires an additional $D'=T_F' *T$ entries in the buffer FIFO 220.

Advantageously, only one FIFO (e.g., buffer FIFO 220) must have a relatively large depth (K-entries) to implement the buffering of the data values received from the N incoming data streams. Note that conventional receiving agent 20 requires three such large entry FIFOs $30_1$-$30_N$. Similarly, only one data bus (WO) having a maximum throughput of T is required to supply the downstream processing unit 230. In comparison, the conventional receiving agent 20 requires N data buses WD_1, WD_2, WD_N, each having a maximum throughput of T, to supply the associated downstream processing unit 40. The MISORC circuit 205 of the present invention therefore improves the efficiency of data bus usage (thereby reducing routing congestion) and reduces the amount of memory required to perform the same function.

In the examples described above, the frequency of the clock signal (CLK_P) used to operate the arbitration circuit 210 is equal to the maximum frequency of the input clock signals CLK_1, CLK_2 and CLK_N. For example, if the input clock signals CLK_1, CLK_2 and CLK_N have frequencies of 1 GHz, 1 GHz and 2 GHz respectively, then the local clock signal CLK_P would have a frequency of 2 GHz. In an alternate embodiment, the frequency of the clock signal used to operate the arbitration circuit 210 is greater than the maximum frequency of the input clock signals CLK_1, CLK_2 and CLK_N. In a particular embodiment, the frequency of the clock signal used to operate the arbitration circuit 210 is equal to the sum of the frequencies of the input clock signals CLK_1, CLK_2 and CLK_N. For example, if the input clock signals CLK_1, CLK_2 and CLK_N have frequencies of 1 GHz, 1 GHz and 2 GHz respectively, then the clock signal used to operate the arbitration circuit would have a frequency of 4 GHz. Operating the arbitration circuit 210 in response to a clock signal having a higher frequency advantageously reduces the number of entries required in the synchronization FIFOs $201_2$, $201_2$ and $201_N$, effectively transferring some of the entry requirements to the buffer FIFO 220.

Figure 2B:
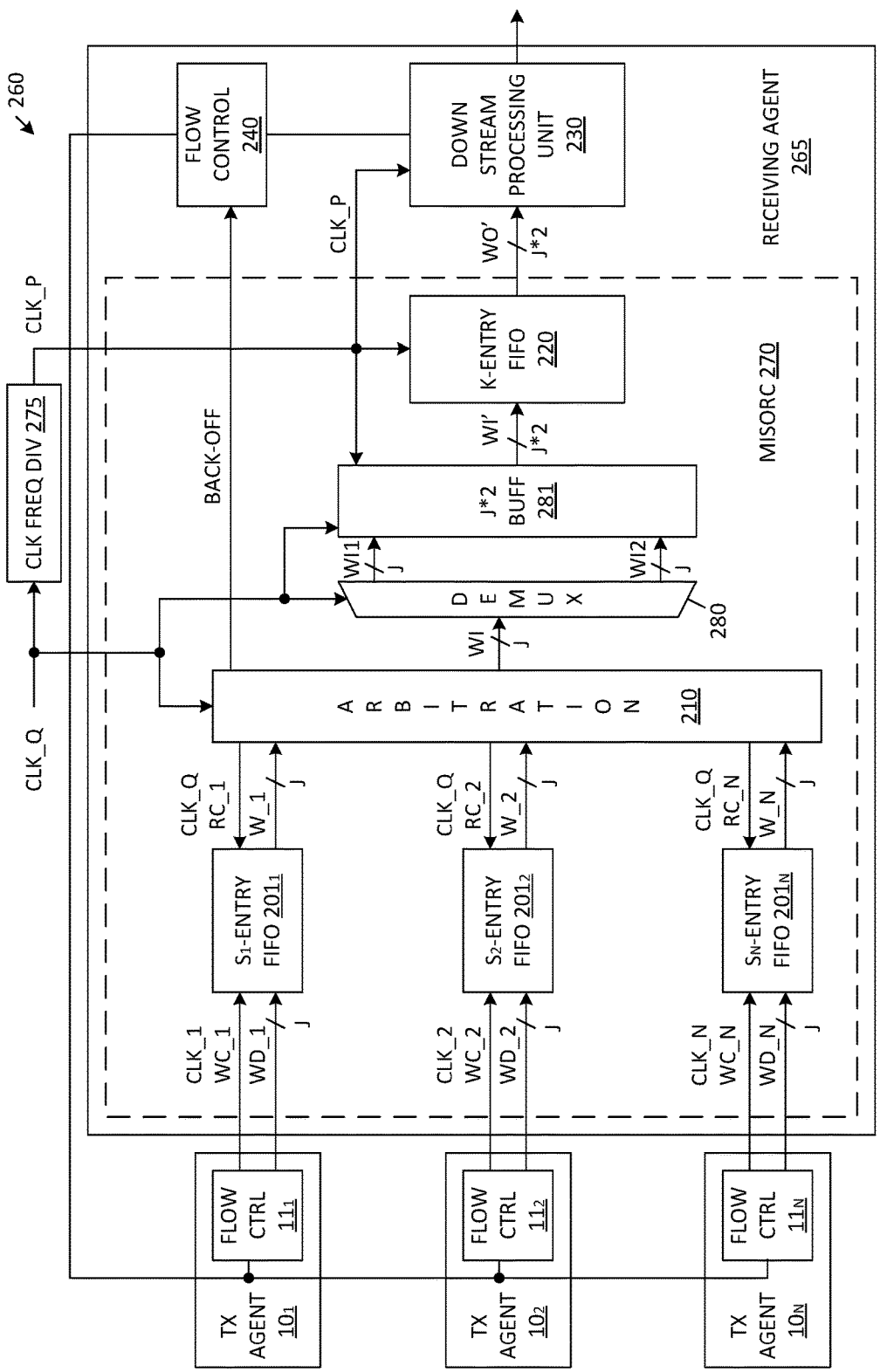
FIG. 2B is a block diagram illustrating a multi-clock domain communication system including a plurality of transmitting agents and a multiple-clock domain receiving agent in accordance with an alternate embodiment of the present invention.

FIG. 2B is a block diagram illustrating a communication system 260 in accordance with such an alternate embodiment of the present invention. Similar elements in FIGS. 2A and 2B are labeled with similar reference numbers. Thus, communication system 260 includes transmitting agents $10_1$, $10_2$ and $10_N$ (which include flow control circuits $11_1$, $11_2$ and $11_N$) and a multiple-clock domain receiving agent 265 that includes MISORC circuit 270, downstream processing unit 230 and flow control unit 240. MISORC circuit 270 includes synchronization FIFOs $201_1$, $201_2$ and $201_N$, arbitration circuit 210 and buffer FIFO 220, which operate in the manner described above. In addition, MISORC circuit 270 includes de-multiplexer 280 and data buffer 281. A clock frequency divider circuit 275, receives an input clock signal CLK_Q, and in response, provides the output clock signal CLK_P, which is used to control the K-entry buffer FIFO 220 and downstream processing unit 230 in the manner described above. Clock frequency divider circuit 275 may receive the input clock signal CLK_Q from a source outside of the receiving agent 265. Clock frequency divider circuit 275 receives the input clock signal CLK_Q, and in response, generates an output clock signal CLK_P having a frequency lower than the frequency of the input clock signal CLK_Q. In one embodiment, clock divider circuit 275 divides the input clock signal by an integer value M, wherein the frequency of the output clock signal CLK_P is 1/M times the frequency of the local clock signal CLK_P. In the examples described herein, M=2, such that the frequency of CLK_P is one half the frequency of CLK_Q. Other values of M are possible.

Arbitration circuit 210, de-multiplexer 280 and the write port of data buffer 281 operate in response to the CLK_Q signal. Assuming that valid data is stored in synchronization FIFOs $201_1$, $201_2$ and/or $201_N$, arbitration circuit 210 provides a J-bit data value WI from the synchronization FIFOs to de-multiplexer 280 every cycle of the CLK_Q signal.

Advantageously, arbitration circuit 210 is allowed to operate at a faster clock frequency than the frequency of the local clock signal CLK_P. As described above, this may reduce the number of entries required by the synchronization FIFOs $201_1$, $201_2$ and $201_N$. De-multiplexer 280 routes successively received data values WI as the J-bit data value WI1 and as the J-bit data value WI2 during successive cycles of the CLK_Q signal. These two J-bit data values WI1 and WI2 are written to a J*2-bit wide entry of data buffer 281 during two successive cycles of the CLK_Q signal. This J*2-bit wide data entry (which includes the two J-bit data values WI1 and WI2) is read from buffer 281 as data value WI' in response to the CLK_P signal. Buffer FIFO 220 stores the J*2-bit data values WI' provided by data buffer 281 in response to the CLK_P signal. These J*2-bit data values are subsequently read out of the buffer FIFO 220 and provided to the downstream processing unit 230 as J*2-bit data values WO' in response to the CLK_P signal.

Note that the local clock signal CLK_P of communication system 260 (FIG. 2B) can be half the frequency of the local clock signal CLK_P of communication system 250, while maintaining the same maximum throughput T, because the width of the data values provided to downstream processing unit 230 in communication system 260 are twice as large.

Figure 3:
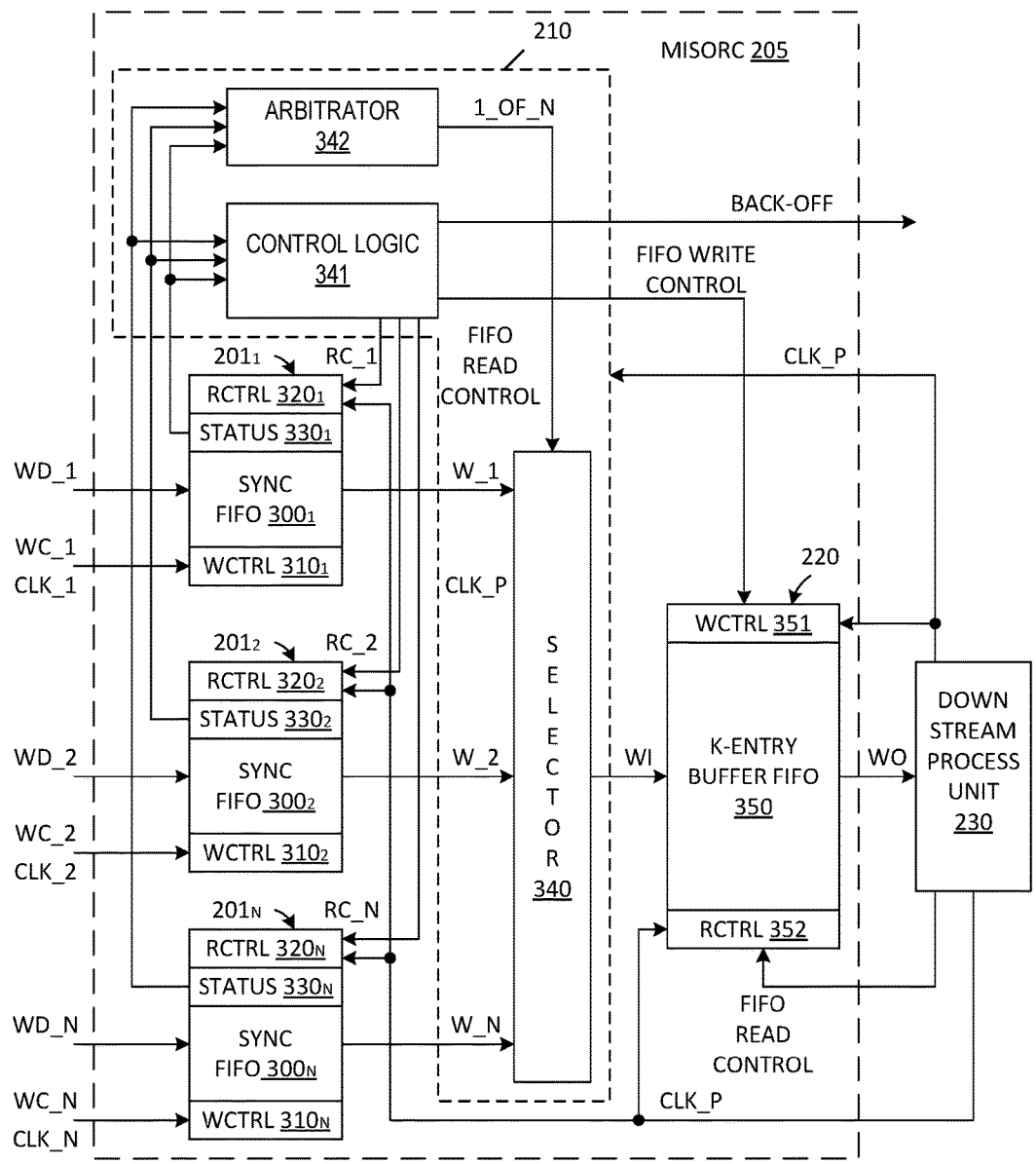
FIG. 3 is a block diagram illustrating more details of the receiving agent of FIG. 2A in accordance with one embodiment of the present invention.

FIG. 3 is a block diagram illustrating more details of the receiving agent 200 of FIG. 2A in accordance with one embodiment of the present invention. As illustrated by FIG. 3, synchronizing FIFOs $201_1$, $201_2$ and $201_N$ include synchronizing FIFO memories $300_1$, $300_2$ and $300_N$, respectively, which are coupled to receive J-bit input data streams WD_1, WD_2 and WD_N, respectively. Synchronizing FIFOs $201_1$, $201_2$ and $201_N$ further include write control circuits $310_1$, $310_2$ and $310_N$, respectively, which are coupled to receive write enable control signals WC_1, WC_2 and WC_N, respectively, and write clock signals CLK_1, CLK_2 and CLK_3, respectively, provided by transmitting agents $10_1$, $10_2$ and $10_N$. Synchronization FIFOs $201_1$, $201_2$ and $201_N$ further include read control circuits $320_1$, $320_2$ and $320_N$, respectively, and status indicator circuits $330_1$, $330_2$ and $330_N$, respectively. The status indicator circuits $330_1$, $330_2$ and $330_N$ provide information identifying the full(ness)/empty statuses of synchronizing FIFO memories $300_1$, $300_2$ and $300_N$, respectively. In one embodiment, the status indicator circuits $330_1$, $330_2$ and $330_N$ provide read/write pointer addresses and/or valid bits associated with entries of the corresponding FIFO memories $300_1$, $300_2$ and $300_N$. As described above, the synchronizing FIFO memories $300_1$, $300_2$ and $300_N$ have $S_1$, $S_2$ and $S_N$ entries, respectively. In the manner described above, control logic 341 asserts a back-off message (BACK-OFF) to flow control circuit 240 upon determining that any one of the synchronization FIFOs $300_1$-$300_N$ has been filled to its predetermined threshold number of entries ($E_{TH}$).

The input port of synchronizing FIFO memory $300_1$, write control circuit $310_1$ and status indicator circuit $330_1$ all operate in the same clock domain (CLK_1) as the connected transmitting agent $10_1$. Similarly, the input port of synchronizing FIFO memory $300_2$, write control circuit $310_2$ and status indicator circuit $330_2$ all operate in the same clock domain (CLK_2) as the connected transmitting agent $10_2$. The input port of synchronizing FIFO memory $300_N$, write control circuit $310_N$ and status indicator circuit $330_N$ all operate in the same clock domain (CLK_N) as the connected transmitting agent $10_N$. Thus, incoming data is written into the receiving FIFOs under the control of the respective FIFOs' write enable control signal/clock signal.

Arbitration circuit 210 includes selector circuit 340, control logic circuitry 341 and arbitrator 342. Selector circuit 340 routes one of the N data streams W_1, W_2 or W_N provided by synchronizing FIFO memories $300_2$, $300_2$ and $300_N$, respectively, in response to a control signal (1° F. N) provided by arbitrator 342. Arbitrator 342 generates the control signal (1° F. N) in response to FIFO status signals received from status indicator circuits $330_2$, $330_2$ and $330_N$. Every clock cycle, arbitrator 342 will select an entry, if any are valid, from one of the N synchronizing FIFO memories $300_2$, $300_2$ and $300_N$. The selection policy could be based on a ranking of a combination of priorities, as described in more detail below in connection with FIG. 4.

Control logic circuitry 341 receives the status information provided by status indictor circuits $330_2$, $330_2$ and $330_N$, and in response, initiates read accesses to synchronizing FIFO memories $300_2$, $300_2$ and $300_N$ by issuing read commands to read control circuits $320_2$, $320_2$ and $320_N$, respectively. These read operations are performed in the local clock domain (CLK_P) of the receiving agent 200. More specifically, control logic 341 provides read enable signals RC_1, RC_2 and RC_N to enable read operations to read control circuits $320_2$, $320_2$ and $320_N$, respectively. Read control circuits $320_2$, $320_2$, $320_N$, also receive the local clock signal CLK_P to control the timing of these read operations.

The J-bit write data values (WI) routed by selector circuit 340 are provided to K-entry FIFO 220, which includes K-entry buffer FIFO memory 350, write control circuit 351 and read control circuit 352. Upon the selection of a valid entry to be transferred through selector circuit 340, control logic circuitry 341 issues a write command to write control circuit 351, which causes the write data value WI routed by selector circuit 340 to be written to the buffer FIFO memory 350. Note that read control circuits $320_1$, $320_2$ and $320_N$, selector circuit 340, control logic 341, arbitrator 342 and write control circuit 351 all operate in the clock domain (CLK_P) of the receiving agent 200.

Upon writing a valid entry to buffer FIFO memory 350, control logic circuit 341 accesses the read control circuit $320_1$, $320_2$ or $320_N$ of the associated synchronizing FIFO $300_1$, $300_2$ or $300_N$ to advance the read pointer of this synchronizing FIFO by one position. If a valid bit is used by the associated status indicator circuit $330_1$, $330_2$ or $330_N$, the valid bit associated with the written entry is invalidated.

Downstream processing unit 230 issues read commands to read control circuit 352, thereby causing data values (WO) to be read from buffer FIFO memory 350 and provided to downstream processing unit 230 for further processing. Note that downstream processing unit 230 and the read control circuit 352 operate in the same clock domain (CLK_P) in the illustrated embodiment. However, the clock rate of the downstream processing unit 230 and read control circuit 352 can be different than the clock rate of arbitration unit 210 and write control circuit 351 in other embodiments, as long as aggregate average of the incoming throughputs is not greater that T, the maximum throughput of downstream processing unit 230.

Figure 4:
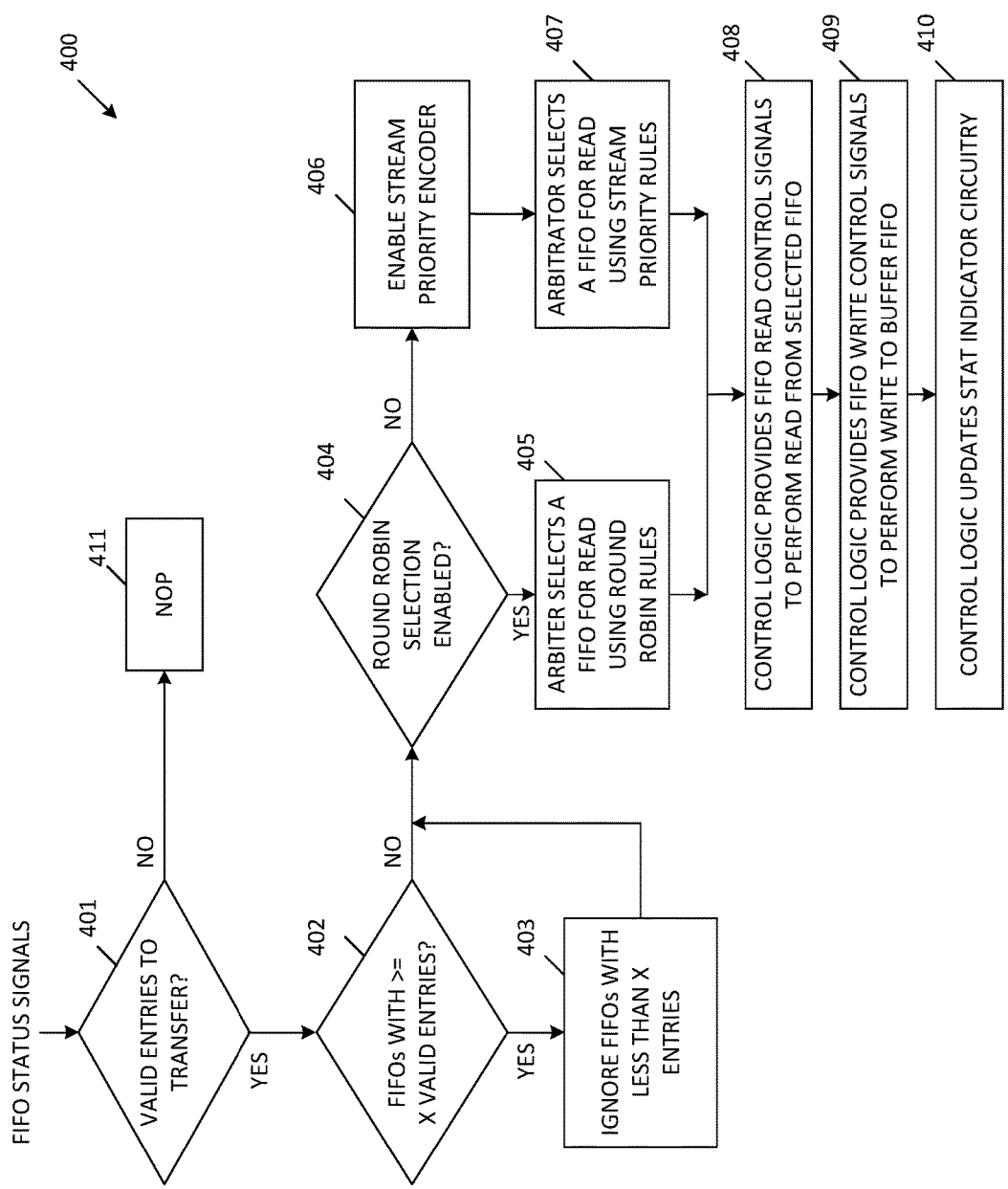
FIG. 4 is a flow diagram illustrating a method for operating the arbitration circuit of FIGS. 2A and 3 in accordance with one embodiment of the present invention.

FIG. 4 is a flow diagram 400 illustrating a method for operating arbitration circuit 210 in accordance with one embodiment of the present invention. Control logic 341 monitors status indicator circuits $330_1$, $330_2$ and $330_N$ to determine whether synchronization FIFO memories $300_1$, $300_2$ and $300_N$ store any valid data values to be transferred (Step 401). If not (Step 401, NO branch), no operation (NOP) is performed (Step 411). If so, (Step 401, YES branch), then control logic 341 determines whether any of synchronization FIFO memories $300_1$, $300_2$ and $300_N$ stores 'X' or more valid entries, wherein X is an integer that indicates a predetermined 'fullness' level (Step 402). In one embodiment, 'X' is equal to one. If one of the synchronization FIFO memories $300_1$, $300_2$ and $300_N$ stores 'X' or more valid entries (Step 402, YES branch), control logic 342 temporarily ignores the synchronization FIFO memories $300_1$, $300_2$ and $300_N$ that store less than 'X' valid entries (Step 403), and processing continues to Step 404. If not (Step 402, NO branch), then processing continues directly to Step 404. In Step 404, control logic 341 determines whether round robin arbitration is enabled. If so (Step 404, YES branch), control logic 341 enables arbitrator 342 to select one of the non-ignored synchronization FIFO memories $300_1$, $300_2$ or $300_N$ using a set of predetermined round robin rules (Step 405). More specifically, arbitrator 342 provides a control signal (1_OF_N) that causes selector circuit 340 to route data provided by the selected synchronization FIFO memory. Control logic 341 then provides a read control (enable) signal to the read control circuit $320_1$, $320_2$ or $320_N$ of the selected synchronization FIFO memory $300_1$, $300_2$ or $300_N$, thereby causing a data value to be read from the selected synchronization FIFO memory (Step 408). This read data value is routed through selector circuit 340 to buffer FIFO 350. Control logic 341 also provides a write control (enable) signal to write control circuit 351, thereby causing the read data value to be written to buffer FIFO 350 (Step 409). Control logic 341 also updates status indicator circuit $330_1$, $330_2$ or $330_N$ associated with the read operation to properly indicate that the data value has been transferred from the associated synchronization FIFO memory $300_1$, $300_2$ or $300_N$ (Step 410).

If round robin selection is not enabled (Step 404, NO branch), then control logic 341 enables a stream priority encoder within arbitrator 342 (Step 406). In response, arbitrator 342 select one of the non-ignored synchronization FIFO memories $300_1$, $300_2$ or $300_N$ based on priorities assigned to the synchronization FIFO memories $300_1$, $300_2$ and $300_N$ (Step 407). These priorities can be assigned based the characteristics of the transmitting agents that send data to synchronizing FIFOs $300_1$, $300_2$ and $300_N$. For example, transmitting agents that transmit at higher frequencies can be assigned higher priorities. After arbitrator 342 has selected a synchronizing FIFO memory to be read, control logic 341 causes the selected synchronizing FIFO memory to be read (e.g., by activating the corresponding read control signal RC_1, RC2 or RC_N) (Step 408), causes the read data value to be written to buffer FIFO 350 (e.g., by activating the FIFO write control signal) (Step 409) and causes the associated status indicator circuit to be updated (Step 410).

Although the embodiment of FIG. 4 describes arbitration based on round robin selection and stream priority, it is understood that other/additional types of arbitration can be used in other embodiments.

In the embodiments illustrated by FIGS. 2A-2B and 3, the synchronization FIFOs $201_1$-$201_N$ are located near the buffer FIFO 220 and the downstream processing unit 230. As a result, connections between these circuit elements are less likely to impede the connections of other circuitry not related to the MISORC circuit 205 (i.e., connections between various circuit elements may be implemented in silicon, and do not require an extensive bus structure in an overlying multi-layer metal interconnect structure).

Figure 5:
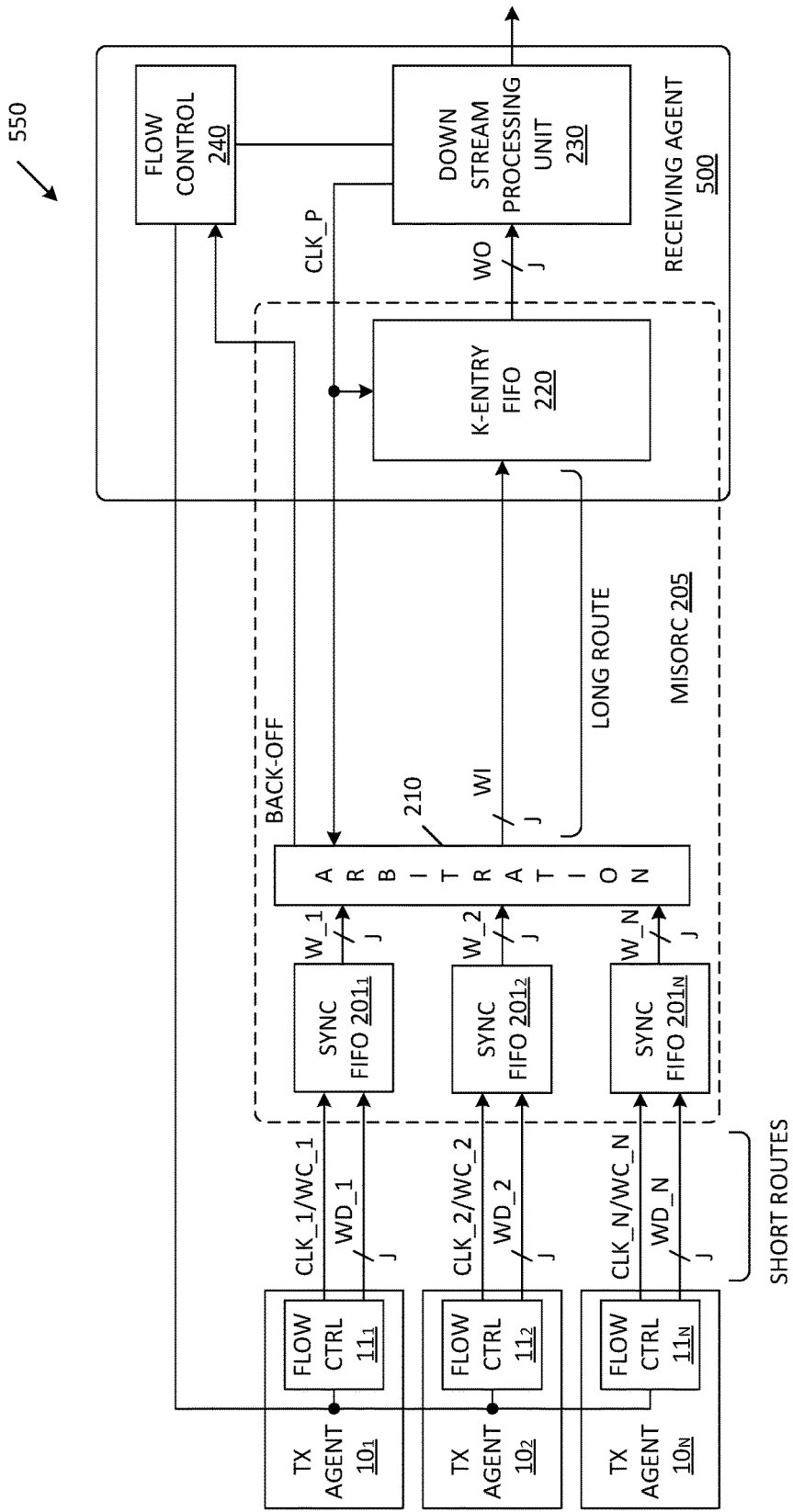
FIG. 5 is a block diagram of a multi-clock communication system including transmitting agents in close proximity with one another, and a receiving agent (and downstream processing unit) located a relatively long distance from the transmitting agents, in accordance with one embodiment of the present invention.

FIG. 5 illustrates a multi-clock domain communication system 550 in accordance with an alternate embodiment. Similar elements in FIGS. 2A and 5 are labeled with similar reference numbers. In the communication system 550 of FIG. 5, the transmitting agents $10_1$-$10_N$ are in close proximity with one another, and also in close proximity with synchronization FIFOs $201_1$-$201_N$ and arbitration circuit 210, such that the data streams WD_1, WD_2 and WD_N are coalesced to a single data stream WI at a location close to the transmitting agents $10_1$-$10_N$. As a result, connections between the transmitting agents $10_1$-$10_N$ and data bus WI can be implemented largely in silicon, whereby minimal resources of the multi-layer metal interconnect structure are required to coalesce the data streams WD_1, WD_2 and WD_N to form the data stream WI.

In the communication system 550 of FIG. 5, the buffer FIFO 220 of the MISORC circuit 205 is located in close proximity with the downstream processing unit 230 (i.e., within the receiving agent 500). This effectively partitions the MISORC circuit 205 into a first portion, located near transmitting agents $10_1$-$10_N$ and including synchronizing FIFOs $201_1$-$201_N$ and arbitration circuit 210, and a second portion, located near downstream processing unit 230 and including buffer FIFO memory 220.

In this embodiment, the receiving agent 200 (including the K-entry buffer FIFO 220 and downstream processing unit 230) is located a relatively long distance from the transmitting agents $10_1$-$10_N$. Consequently, a relatively long distance exists between the arbitration circuit 210 and the buffer FIFO memory 220. Although a long route exists from the arbitration circuit 210 to the buffer FIFO 220, the number of buses implemented in the multi-layer metal interconnect structure is reduced to one (i.e., the WI bus between arbitration circuit 210 and buffer FIFO 220), resulting in reduced routing congestion and a smaller potential die size for communication system 550.

Figure 6:
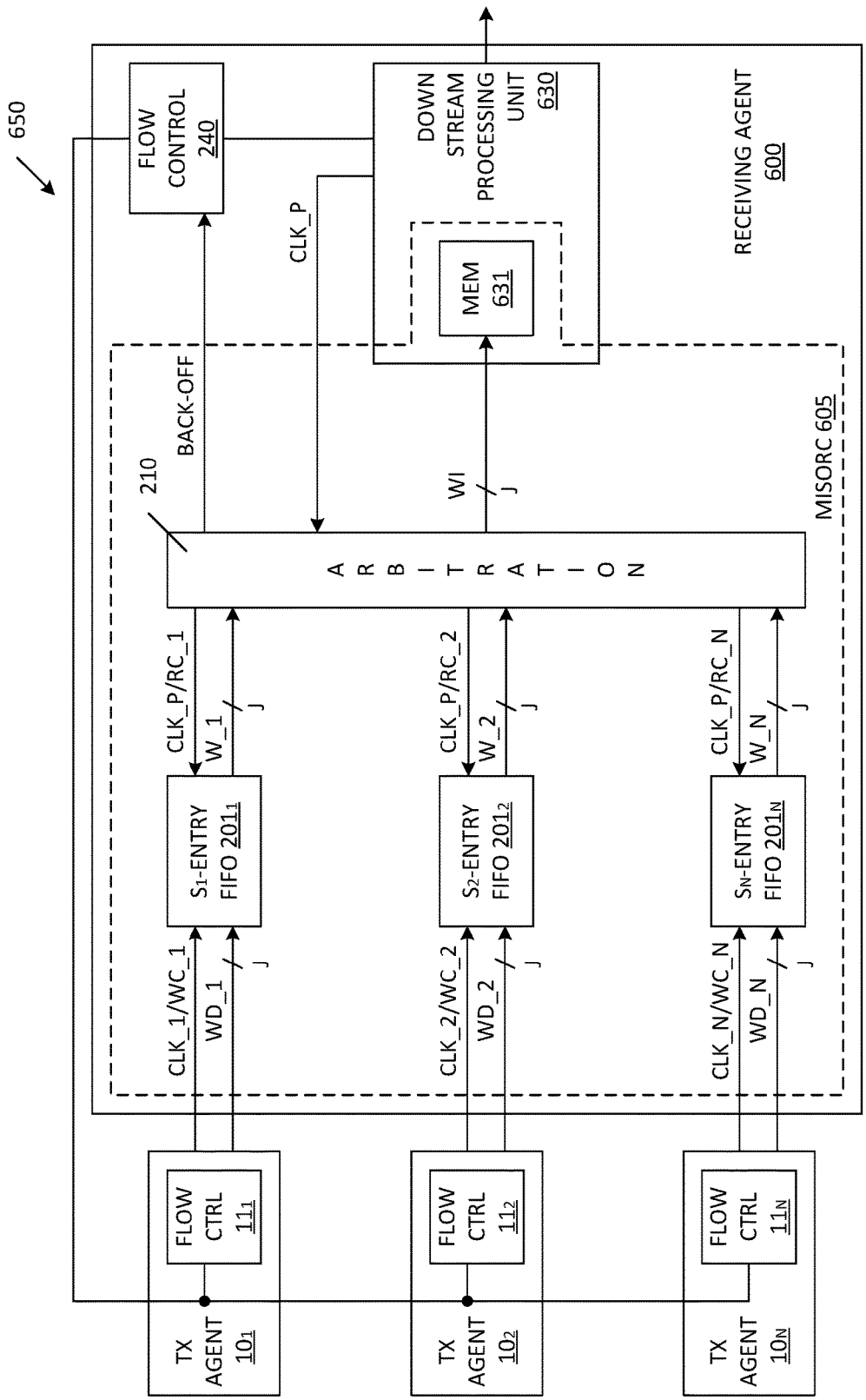
FIG. 6 is a block diagram of a multi-clock communication system similar to the multi-clock communication of FIG. 2A, wherein a buffer FIFO of FIG. 3 is eliminated, and the functionality of the buffer FIFO is implemented within a downstream processing unit, in accordance with another embodiment of the present invention.

FIG. 6 illustrates a multi-clock domain communication system 650 in accordance with another embodiment. Similar elements in FIGS. 2A and 6 are labeled with similar reference numbers. In the communication system 650 of FIG. 6, the buffer FIFO 220 of communication system 250 is eliminated, and the functionality of buffer FIFO 220 is implemented by memory 631 included within the downstream processing unit 630 of receiving agent 600. Thus, a portion of the resulting MISORC 605 is implemented within the downstream processing unit 630.

Figure 7:
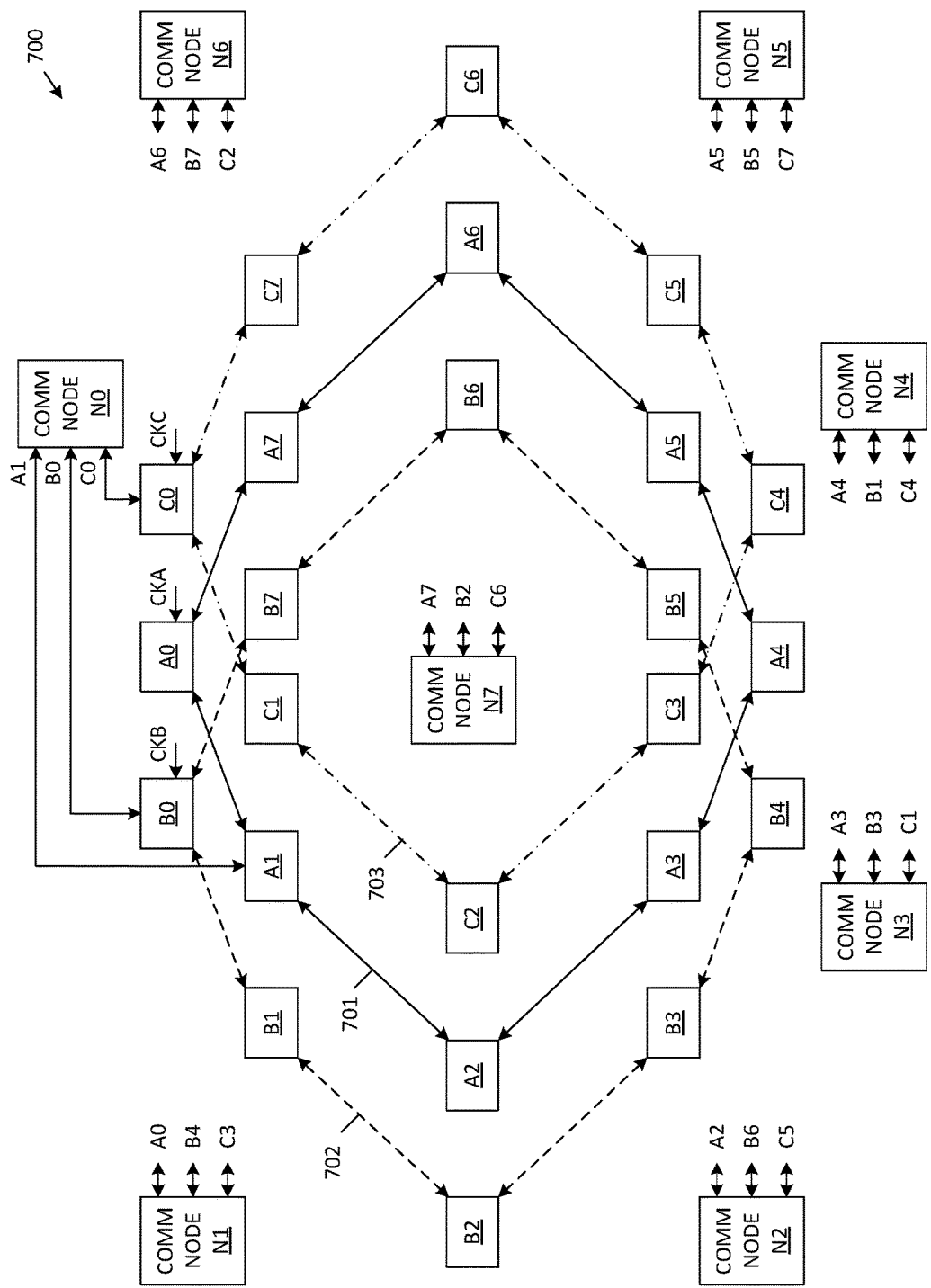
FIG. 7 is a block diagram of a permutated ring network, which implements the Multiple Input to Single Output Resynchronization and Coalescing (MISORC) circuits of the present invention in accordance with various embodiments.

FIG. 7 is a block diagram of a permutated ring network 700, which can implement the Multiple Input to Single Output Resynchronization and Coalescing (MISORC) system in accordance with various embodiments of the present invention. In the illustrated embodiment, permutated ring network 700 includes eight communication nodes N0-N7 and three bi-directional source synchronous ring networks 701, 702 and 703, each of which are fabricated on the same integrated circuit chip. Each of the ring networks 701-703 functions as a communication channel.

Each of the communication channels 701-703 includes a plurality of data transport station connected by bi-directional links (interconnects). More specifically, communication channel 701 includes data transport stations A0-A7, communication channel 702 includes data transport stations B0-B7 and communication channel 703 includes data transport stations C0-C7. The bi-directional links of communication channel 901 are shown as solid lines that connect the data transport stations A0-A7 in a ring. The bi-directional links of communication channel 702 are shown as dashed lines that connect the data transport stations B0-B7 in a ring. The bi-directional links of communication channel 703 are shown as dashed-dotted lines that connect the data transport stations C0-C7 in a ring. The bi-directional links allow for the simultaneous transmission of data/clock signals in both the clockwise and counterclockwise directions.

In general, each of the data transport stations A0-A7, B0-B7 and C0-C7 provides an interface that enables the transfer of data between the communication nodes N0-N7 and the communication channels 701-703.

Each of the communication channels 701-703 transmits data based on a corresponding master clock signal. Thus, communication channels 701, 702 and 703 operate in response to master clock signals CKA, CKB and CKC, respectively. Each of the master clock signals CKA, CKB and CKC may have the same frequency, or different frequencies.

Each of the communication nodes N0-N7 is coupled to a unique one of the data transport stations A0-A7, B0-B7 and C0-C7 in each of the three communication channels 701-703. For example, communication node N0 is connected to data transport station A1 in communication channel 701, data transport station B0 in communication channel 702 and data transport station C0 in communication channel 703. Note that the physical connections between the communication nodes N1-N7 and the data transport stations A0-A7, B0-B7 and C0-C7 are not explicitly shown in FIG. 7 for clarity.

In the illustrated embodiment, communication node N0 receives input data (and input clock signals CKA, CKB and CKC) from data transport stations A1, B0 and C0. In one embodiment, communication node N0 includes the MISORC circuit 205 described above in connection with FIGS. 2 and 3, wherein the input data provided by data transport stations A1, B0 and C0 is read into synchronization FIFOs $201_1$, $201_2$ and $201_N$, respectively, in response to the input clock signals CKA, CKB and CKC, respectively. Arbitration circuit 210 controls the routing of this input data to buffer FIFO 220, which then provides the input data to downstream processing unit 230 within communication node N0. In this manner, the MISORC 205 of the present invention enables each of the communication nodes N0-N7 to receive input data from the three bi-directional ring networks 901-903.

In accordance with another embodiment of the present invention, each of the data transport stations A0-A7, B0-B7 and C0-C7 includes a MISORC circuit similar to MISORC circuit 205, whereby data received in a clockwise direction within a data transport station is read into one synchronization FIFO of the MISORC circuit, and data received in a counterclockwise direction within a data transport station is read into another synchronization of the MISORC circuit. For example, data received by data transport station B0 in the clockwise direction from data transport station B1 can be read into synchronization FIFO $201_1$ in response to a clockwise traveling version of the input clock signal CKB. Similarly, data received by data transport station B0 in the counterclockwise direction from data transport station B7 can be read into synchronization FIFO $201_2$ in response to a counterclockwise traveling version of the input clock signal CKB (wherein the clockwise and counterclockwise traveling versions of the input clock signal CKB are asynchronous). Note that the synchronization FIFO $201_N$ is not used in this embodiment.

Permutated ring network 700 is described in more detail on commonly-owned, co-pending U.S. patent application Ser. No. 15/816,374, which is hereby incorporated by reference in its entirety.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

We claim:

1. A communication system comprising:
   a plurality of synchronization first-in first-out (FIFO) memories, each coupled to receive a corresponding input data stream and a corresponding clock signal from a corresponding transmitting agent, wherein each clock signal is asynchronous with respect to each other clock signal;
   an arbitration circuit that reads data from the plurality of synchronization FIFO memories in response to a local clock signal, wherein each of the plurality of synchronization FIFO memories includes just enough entries to synchronize the data of its corresponding input data stream with the local clock signal; and
   a buffer FIFO memory coupled to store the data read by the arbitration circuit from the plurality of synchronization FIFO memories, wherein the buffer FIFO operates in response to the local clock signal.

2. The communication system of claim 1, further comprising a processing unit that retrieves data from the buffer FIFO memory in response to the local clock signal at a maximum throughput.

3. The communication system of claim 2, wherein each input data stream has a throughput less than or equal to the maximum throughput.

4. The communication system of claim 2, further comprising flow control circuitry that controls input data streams received from the transmitting agents.

5. The communication system of claim 4, wherein the flow control circuit limits the average throughput of the input data streams to the maximum throughput.

6. The communication system of claim 1, wherein each clock signal has the same frequency.

7. The communication system of claim 1, wherein a first synchronization FIFO memory of the plurality of synchronization FIFO memories is coupled to receive a first input data stream and a first clock signal from a first direction on a first bidirectional ring network, and wherein a second synchronization FIFO memory of the plurality of synchronization FIFO memories is coupled to receive a second input data stream and a second clock signal from a second direction on the first bidirectional ring network.

8. The communication system of claim 1, wherein a first synchronization FIFO memory of the plurality of synchronization FIFO memories is coupled to receive a first input data stream and a first clock signal from a first ring network, and wherein a second synchronization FIFO memory of the plurality of synchronization FIFO memories is coupled to receive a second input data stream and a second clock signal from a second ring network.

9. The communication system of claim 1, wherein the local clock signal has a frequency at least as high as the highest frequency of the clock signals received by the synchronization FIFO memories.

10. A communication system comprising:
    a plurality of synchronization first-in first-out (FIFO) memories, each coupled to receive and store data provided by a corresponding transmitting agent;
    an arbitration circuit that reads data from the plurality of synchronization FIFO memories in response to a local clock signal, wherein each of the plurality of synchronization FIFO memories includes a minimum number of entries specified by:
      a number of entries required to synchronize the data stored in the synchronization FIFO to the local clock signal;
      a number of entries required to store the data in the synchronization FIFO during a threshold time period that a combined data throughput of the transmitting agents is allowed to exceed a read data throughput enabled by the local clock signal;
      a number of entries required to store the data in the synchronization FIFO during a flow control response time required to stop data from being provided to the synchronization FIFO by the corresponding transmitting agent; and
      a number of entries read from the synchronization FIFO during the threshold time period and the flow control response time, and
    a buffer FIFO memory coupled to store the data read by the arbitration circuit from the plurality of synchronization FIFO memories.

11. The communication system of claim 10, further comprising a processing unit that retrieves data from the buffer FIFO memory in response to the local clock signal at a maximum throughput.

12. The communication system of claim 11, wherein each input data stream has a throughput less than or equal to the maximum throughput.

13. The communication system of claim 11, further comprising flow control circuitry that controls the data received by the synchronization FIFOs from the transmitting agents.

14. The communication system of claim 13, wherein the flow control circuit limits the average throughput of the data received by the synchronization FIFOs to the maximum throughput.

15. The communication system of claim 10, wherein a first synchronization FIFO memory of the plurality of synchronization FIFO memories is coupled to receive a first input data stream and a first clock signal from a first direction on a first bidirectional ring network, and wherein a second synchronization FIFO memory of the plurality of synchronization FIFO memories is coupled to receive a second input data stream and a second clock signal from a second direction on the first bidirectional ring network.

16. The communication system of claim 10, wherein a first synchronization FIFO memory of the plurality of synchronization FIFO memories is coupled to receive a first input data stream and a first clock signal from a first ring network, and wherein a second synchronization FIFO memory of the plurality of synchronization FIFO memories is coupled to receive a second input data stream and a second clock signal from a second ring network.

17. A method comprising:
receiving a plurality (N) of input data streams and corresponding input clock signals from a corresponding plurality of transmitting agents;
storing each of the plurality of input data streams in a corresponding synchronization FIFO memory in response to the corresponding input clock signal;
arbitrating the reading of data from each synchronization FIFO memory, wherein data is read from each synchronization FIFO memory in response to a local clock signal, wherein the local clock signal is asynchronous with respect to the input clock signals;
storing the data read from each synchronization FIFO memory in a buffer FIFO memory, wherein the buffer FIFO operates in response to the local clock signal; and
transferring data from the buffer FIFO memory to a downstream processing unit in response to the local clock signal.

18. The method of claim 17, further comprising transferring data from the buffer FIFO memory to the downstream processing unit at a maximum throughput, wherein each of the input data streams has a throughput less than or equal to the maximum throughput.

19. The method of claim 18, further comprising controlling the throughput of the input data streams.

20. The method of claim 19, further comprising limiting the average throughput of the input data streams to the maximum throughput.

21. The method of claim 17, wherein each of the input clock signals has the same frequency.

22. The method of claim 17, wherein a first synchronization FIFO memory receives a first input data stream and a first clock signal from a first direction on a first bidirectional ring network, and wherein a second synchronization FIFO memory receives a second input data stream and a second clock signal from a second direction on the first bidirectional ring network.

23. The method of claim 17, wherein a first synchronization FIFO memory receives a first input data stream and a first clock signal from a first ring network, and wherein a second synchronization FIFO memory receives a second input data stream and a second clock signal from a second ring network.

* * * * *